A. A. LIBBY.
Can for the Preservation of Raw Meat.
No. 219,164. Patented Sept. 2, 1879.

WITNESSES:
Chas. H. Kimball.
Francis M. Sennette

INVENTOR:
Arthur A. Libby
Per att
William Henry Clifford

UNITED STATES PATENT OFFICE.

ARTHUR A. LIBBY, OF CHICAGO, ILLINOIS.

IMPROVEMENT IN CANS FOR THE PRESERVATION OF RAW MEAT.

Specification forming part of Letters Patent No. 219,164, dated September 2, 1879; application filed January 29, 1879.

*To all whom it may concern:*

Be it known that I, ARTHUR A. LIBBY, of Chicago, in the State of Illinois, have invented certain new and useful Improvements in Cans or Boxes for the Preservation of Meat in the Raw State; and I do hereby declare that the following is a full, clear, and exact description of the same, which will enable others skilled in the art to which it appertains to make and use the same, reference being had to the accompanying drawings, and to letters of reference marked thereon, which form a part of this specification, in which—

Figure 1:
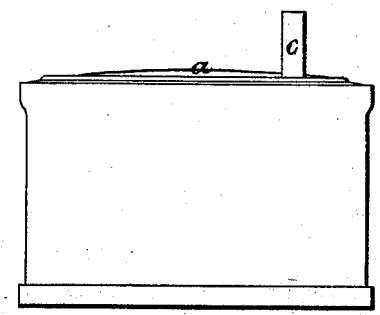
Figure 2:
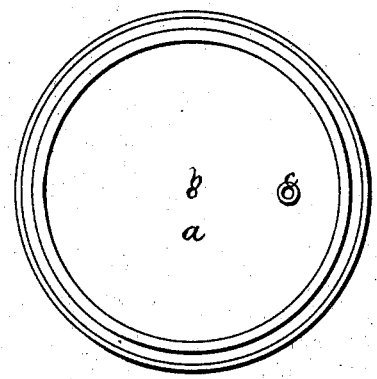
Figure 3:
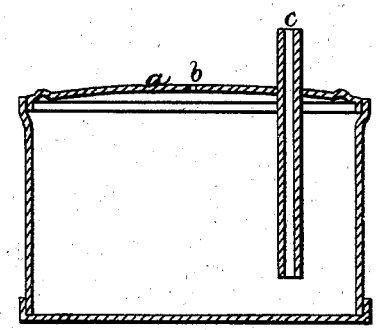

Figure 1 is a side elevation. Fig. 2 is a top plan. Fig. 3 is a side sectional elevation.

The object of my invention is to produce a can or box for the preservation of meat in the raw state.

The can or box is so constructed as to admit of the injection into it of a current of calcined air after the meat to be preserved has been placed therein and the can or box hermetically sealed, with the exception of the injecting aperture or tube and the outlet-aperture for the air forced in through the injecting-tube.

I construct the can or preserving-box of tin or other material, so that it is capable of being hermetically closed when desired. The top or cover of the can or box I make conical or pyramidal in form, or highest at the center. In this top or cover (shown at *a*) I make the small hole or puncture *b*, at the center or highest point of the cover. Through the same top or cover of the can or box I also pass the injecting-tube *c*, which is fitted air-tight into the cover perpendicularly down into the can, and so that it reaches nearly down to the bottom of the same. That portion of the injecting-tube which projects above the top of the can or box, as shown in Fig. 1, is made of soft compressible iron or other material, so that at the required time it can be quickly and easily squeezed and compressed together in order to close the aperture of the injecting-tube when desired.

The other parts of my can or box are made in the usual way, and need no particular description other than is afforded by the drawings. I desire, however, to specify that in use the interior of the box or can may be coated with some adhesive or sticky substance like glue, glycerine, gum, &c.

The head or top of the can or box, which is whole, is fastened in in any of the well-known methods.

The operation in employing the can or box for the preservation of meat is as follows: The meat, after being properly prepared, is placed in the box or can either suspended therein or in contact with the interior. The cover or top is then hermetically sealed or soldered into its place. Calcined air, deprived of the fermentative germs, is then forced into the can or box and into and around the contents, through the injecting-tube *c*, and finds its exit through the aperture *b*. When this process has been continued for a sufficient length of time to remove the germs of fermentation and decomposition within the can or box and its contents, the aperture *b* is then closed in the well-known manner, and then, and immediately, while the process of injecting the air still progresses, the injecting-tube *c* is hermetically closed by compression, and the process is complete.

I do not claim the process herein alluded to, it having been described herein only sufficiently to illustrate the using of the can or box.

What I claim as my invention, and desire to secure by Letters Patent, is—

The preserving can or box herein described, having the pyramidal or conical top piece, *a*, the aperture *b* at the apex or highest point of said cover, the fixed injecting-tube *c*, made of soft metal, on the outside of the can, and extending to the bottom of the can, all for the purposes herein set forth.

In testimony that I claim the foregoing as my own I affix my signature in presence of two witnesses.

ARTHUR ALBION LIBBY.

Witnesses:
 LUTHER CHAD YOUNG,
 ROBERT ALEXANDER STITT.